United States Patent [19]

Livingston

[11] 4,043,651
[45] Aug. 23, 1977

[54] AUDIO-VISUAL DEVICE

[76] Inventor: Robert J. Livingston, 13075 Blairwood Drive, North Hollywood, Calif. 91604

[21] Appl. No.: 541,179

[22] Filed: Apr. 8, 1966

[51] Int. Cl.² ............................................. G03B 31/06
[52] U.S. Cl. ..................................... 353/19; 274/9 R
[58] Field of Search ............... 88/27 A, 27 C, 28 CS; 274/9, 1.7, 13; 353/15–19, 121, 122

[56] References Cited

U.S. PATENT DOCUMENTS

| 2,005,914 | 6/1935 | Freund | 352/26 |
|---|---|---|---|
| 2,587,433 | 2/1952 | Bentley et al. | 88/24 Q |
| 2,683,390 | 7/1954 | Steele | 88/27 C |
| 2,847,905 | 8/1958 | Novak | 88/28 CS |
| 2,925,753 | 2/1960 | Schwartz et al. | 353/19 |
| 3,048,083 | 8/1962 | Rosenbaum | 88/28 CS |
| 3,122,053 | 2/1964 | Dimitracopoulos et al. | 88/27 C |

Primary Examiner—Harry N. Haroian
Attorney, Agent, or Firm—Edward D. O'Brian

[57] ABSTRACT

An audio-visual reproducing device is disclosed which utilizes a program unit having a structure for producing an audio signal and carrying a plurality of visual representations. The program unit is mounted in the device so that a rotatable pick-up is moved along the structure for producing an audio signal in order to obtain an audio output. As such an audio output is obtained a separate optical structure projects a single one of the visual representation so that such representation may be observed.

16 Claims, 9 Drawing Figures

INVENTOR
ROBERT J. LIVINGSTON
BY
EDWARD D. O'BRIAN
ATTORNEY

INVENTOR
ROBERT J. LIVINGSTON
BY
EDWARD D. O'BRIAN
ATTORNEY

AUDIO-VISUAL DEVICE

BACKGROUND OF THE INVENTION

This invention is directed to an audio-visual device and particularly to an audio-visual device which employs a single program unit embodying both the audio and visual portions of the program, and to such a program unit.

A great deal of work has been done with respect to audio reproduction. It has been developed to a high state of accuracy and convenient, economic use. Similarly, a tremendous amount of work has been done in the visual field so that visual patterns can be projected conveniently and economically. However, little work has been done in the area of combined audio-visual equipment and a program useable in association therewith so as to economically and conveniently produce both sound and picture. The finest present examples of development in that field include the sound motion picture and television. However, in each of these cases the equipment for making the program unit and the equipment for reproducing from the program unit are expensive and complex. There is a large gap between these units and the inexpensive non-integrated audio-visual devices available. There is a great demand for audio-visual devices which integrate sound and picture, wherein the program unit is inexpensive and easy to produce, and wherein the audio-visual device which uses this program is inexpensive and can be readily and conveniently used by unskilled people.

SUMMARY OF THE INVENTION

Accordingly, it is an object of this invention to provide an audio-visual program unit which incorporates both sound and picture elements.

It is another object of this invention to provide an audio-visual program unit which can be provided in different embodiments, is useful either in transparency or opaque projection and which carries a physically imprinted sound track thereon from which an audio signal can be produced by conventional phonograph techniques.

It is another object of this invention to provide an audio-visual program unit which has an audio track physically imprinted therein in spiral form and which has a plurality of visual images thereon, and has physical structure on the program unit related to the visual structure so that the program unit can be controlled for successive picture display.

It is a further object of this invention to provide an audio-visual device of inexpensive, reliable construction which employes a unitary audio-visual progam unit.

It is another object of this invention to provide an audio-visual reproduction device which incorporates a phonograph pickup head which reads signals from the audio impression on the program unit and which provides relative motion between the pickup head and the program unit.

It is another object of this invention to provide an audio-visual device which holds a unitary audio-visual program unit in relatively stationary position while a phonograph pickup head moves with respect thereto to read the audio impression on the program unit and wherein the audio-visual reproducing structure successively indexes the program from one position to a next for successive picture display.

It is still another object of this invention to provide an audio-visual reproduction unit which is capable of employing a unitary program unit and to project visual patterns from the unitary program unit either by transparency projection or by opaque projection, in different embodiments.

Other objects and advantages of this invention will become apparent from a study of the following portion of this specification, the claims and the attached drawings in which:

DETAILED DESCRIPTION OF THE INVENTION

As an aid to understanding this invention it can be stated in essentially summary form that it is directed to an audio-visual program unit, and to an audio-visual reproduction device capable of employing the program unit. The program unit comprises a disc imprinted as a spiral groove having audio reproductible characteristics, similar to the conventional phonograph disc. The program unit is preferably of generally circular character and preferably has a central locating hole. In the case of a program unit arranged for transparency visual reproduction, a circular arrangement of transparencies is positioned in a plurality of holes through the disc. The transparencies and holes are preferably adjacent the outer circumference of the disc so as to provide a maximum visual programming space. Furthermore, the program unit is provided with physical structure which can inter-act with the audio-visual reproducer to retain the disc in a particular position for the projection of a particular visual unit on it, and which can be transported upon signal to the next visual unit. In the case of an opaque visual unit, the opaque unit is provided on the opposite side of the disc from the spiral groove. However, physical structure is provided upon the disc for each such opaque unit.

The audio-visual reproduction device useable with the above described program unit comprises means to rotate a conventional phonograph pickup head with respect to the disc. However, since it is desired that the disc be relatively stationary for visual purposes, the pickup head is rotated with respect to the cabinet. Suitable light source and optics are provided depending on whether or not the program unit has opaque or transparent visual units thereon. The physical structure related to each visual unit on the program disc includes a structure which can engage the disc to retain it in position with a particular visual unit in line with the optics. Furthermore, advancement structure permits the retention structure to release, or optionally to drive the disc to a new position wherein a new visual unit is adjacent the optics. The audio reproduction structure includes a phonograph pickup head. Preferably, the audio portion produces a signal which advances the program disc from one visual unit to the next so that the audio-visual reproduction device produces a serial of pictures related to the sound produced.

Figure 1:
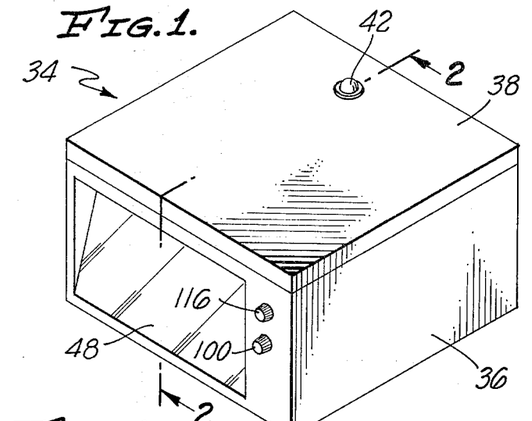
FIG. 1 is an isometric view of the audio-visual reproduction device of this invention in the preferred embodiment wherein the program unit employs transparencies for visual projection and the device employs a friction propelled program unit.
Figure 3:
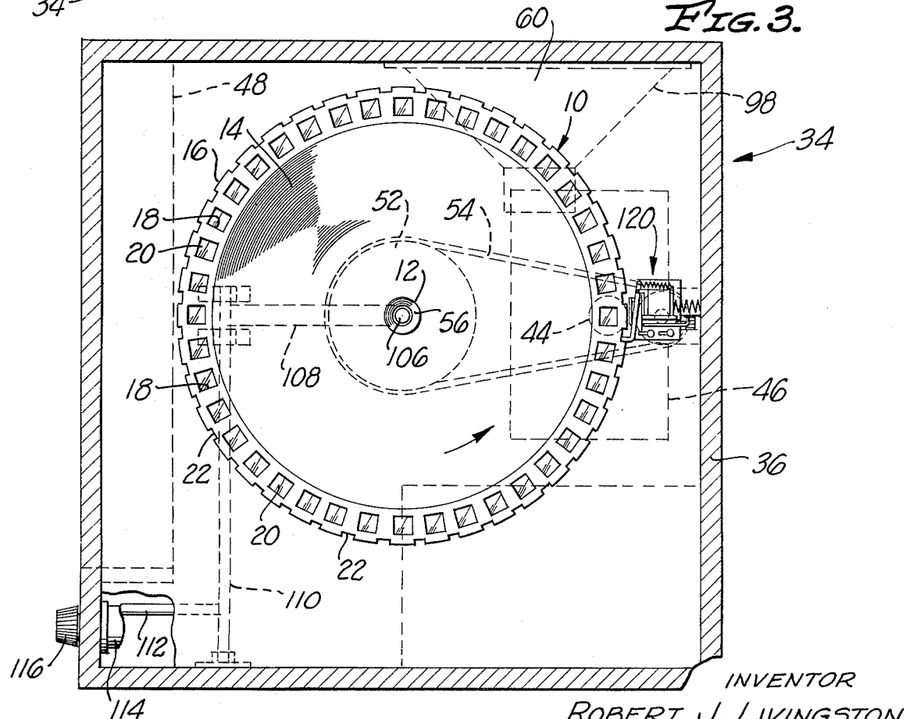
FIG. 3 is a slightly reduced sectional view taken generally along the line 3—3 of FIG. 2.
Figure 4:
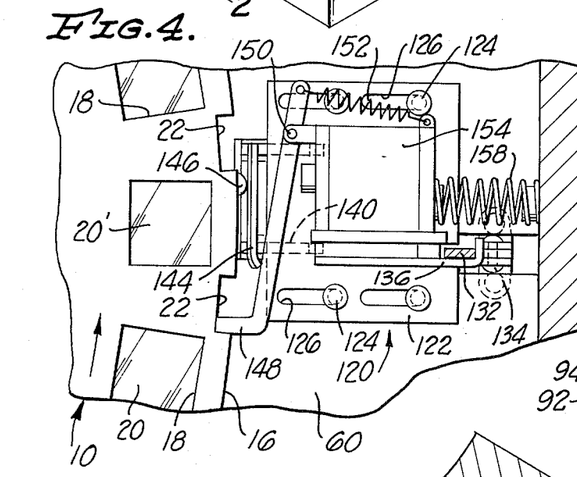
FIG. 4 is an enlarged top plan view of a detail of the structure shown in FIG. 3.

This invention will be understood in greater detail by reference to the following portion of the specification wherein the drawings are described. The preferred embodiment of the program unit is the program unit generally indicated at 10 in FIGS. 1, 2 and 3. The program unit 10 comprises a disc which is relatively thin and preferably has a center hole 12. A spiral audio groove 14 is pressed into the disc 10 as in conventional phonograph practice. The disc 10 is preferably of a suitable polymer composition material useful for that purpose. Program unit 10 preferably has a cylindrical outer surface 16 and transparency windows 18 circularly arranged just inside the outer surface 16. The audio groove 14 extends substantially out to the transparency windows 18. Such configuration is peferred, as compared to a configuration in which the transparency windows 18 are of circularly arranged interiorly of groove 14 because provision can be made adjacent the outer surface for more such transparency windows. A suitable transparency 20 is secured in each of the transparency windows 18. As is clear from the following description, the transparencies proceed in clockwise order around the program unit 10 in accordance with the order of their desired projection. A plurality of index notches 22 are provided around the outer surface 16 of the program unit 10. As is best seen in FIGS. 3 and 4, the index notches 22 are recessed radially inward from surface 16. Furthermore, each of the index notches 22 is arranged in association with a transparency window 18 so that when the program unit 10 is retained in position by a latch entering into one of the index notches 22, one of the transparency windows is in line with the optical structure used in projecting the transparencies 20. The center hole 12 is used to locate the program unit. In some uses the center hole may not be necessary, for the outside diameter can be used for this purpose.

Figure 8:
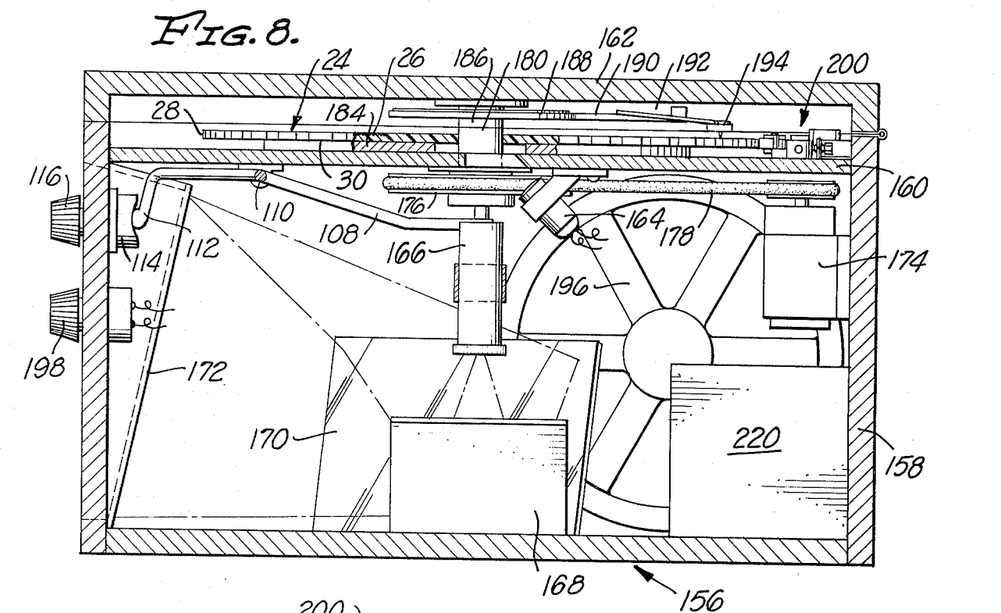
FIG. 8 is a section similar to FIG. 2 showing another embodiment of the audio-visual device of this invention which employs an opaque visual projection and a positive advancement drive for the program unit.
Figure 9:
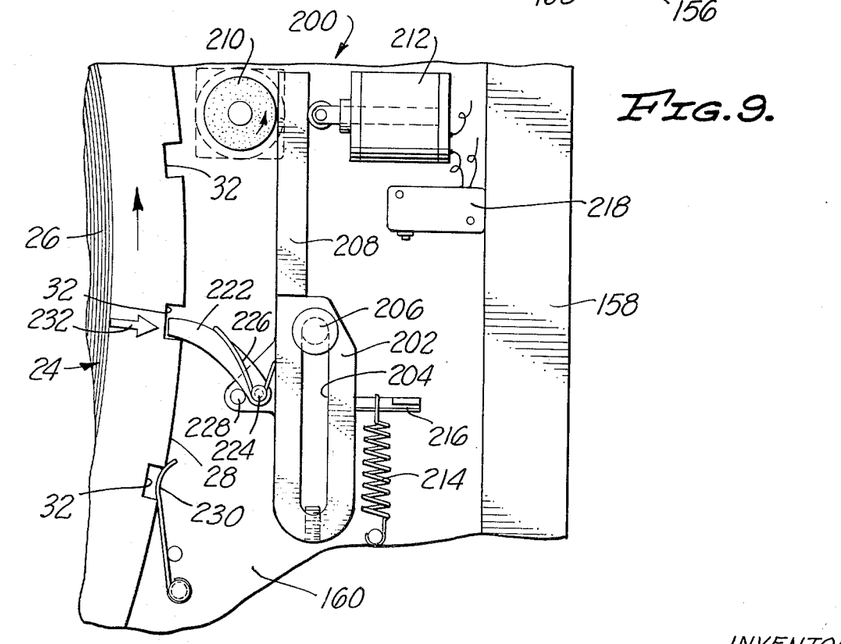
FIG. 9 is an enlarged detailed top plan view of the program unit drive structure of the embodiment of FIG. 8.

Another embodiment of program unit is shown in FIGS. 8 and 9. Program unit 24 shown therein comprises a suitable program unit for use with opaque visual representations and a suitable opaque projector for them. Program unit 24 is preferably provided with a center hole, similarly to center hole 12 and is provided with a conventional spiral audio groove 26. Due to the fact that opaque visual representations are used, they are preferably applied to the opposite side of the program unit 24 from audio groove 26. Therefore, audio groove 26 can extend inward from substantially the outer cylindrical circumferential surface 28 of program unit 24. Thus, opaque visual media are secured to the underside 30, opposite audio groove 26. However, if a two sided program unit 24 is desired, the visual representations can be positioned radially outward from groove 26. In this case, the audio groove on one side of the program unit 10 is related to the visual representations on the other side of program unit 24. Thus, nearly twice as much material can be provided on such program unit 24. Similarly to program unit 10, program unit 24 is provided with a plurality of index notches 32 arranged around the outer cylindrical periphery of the program unit and recessed radially inward from outer surface 28. In either embodiment optical or magnetic signals can embody the audio signal.

Which of the two types of program units is preferably employed depends upon further considerations. One consideration is the desirability of having a program unit with audio signals on both sides thereof. This provides more information transmitted in one program unit. Another consideration is the fact that line drawings are more conveniently provided on opaque materials, and printing upon opaque materials is less expensive than providing transparencies. However, transparencies provide sharper images in continuous tone work. Therefore, in the absence of other considerations, a program unit employing an opaque visual representation would be preferred for line work, and one for transparency projection would be preferred for continuous tone work. Furthermore, employment of opaque visual representations is less expensive because an entire group can be printed at one time and secured as a unitary structure to the program unit 24, while the transparencies 20 must be handled as individual units.

With respect to the audio-visual reproducing equipment, since there are two types of records, the transparency type and the opaque type, there are two different optical systems used with the different types of program units. For convenience of disclosure of the program unit and the audio-visual reproduction equipment, the transparency type program unit and optical system are considered preferred. Similarly, two different types of program unit advance structures are disclosed. It is clear that the program unit must be advanced from one picture to the next, upon demand. This advance may either be positive or the program unit can be subjected to a friction drive which produces a turning torque upon the program unit, and advance from one picture to the next is controlled in step-wise fashion. For convenience of disclosure, the controlled slip type of structure is the preferred embodiment in this application. Thus, FIGS. 1 through 5 show an embodiment of program unit and audio-visual reproduction equipment which employs a transparency and which provides for controlled slip type advancement from one visual indication to the next. Similarly, FIGS. 8 and 9 show an audio-visual reproduction device arranged for projection of opaque visual indication and has advancement structure from one individual visual representation to another which comprises a positive drive. It is clear that these embodiments are independent of each other so that the opaque projector can be used with the controlled slip drive and the transparency projector can be used with the positive program unit drive.

Referring now to the preferred embodiment of FIGS. 1 through 6, the audio-visual reproduction device is generally indicated at 34. The audio-visual device 34 comprises a cabinet 36 having a hinged top 38. Hinges are provided at 40 so as to permit the top 38 to be hinged upwardly for access to part of the device for the insertion of a program unit 10. Lamp 42 is mounted in cover 38 and is directed to project through transparency 20'. Positioned below the transparency which is in a position of transparency 20' is projection lens 44. Lens 44 is directed toward a mirror 46, and mirror 46 is directed toward rear projection translucent screen 48 which is visible from the front of the cabinet. Thus, the transparency in the position of transparency 20' can be projected onto the screen 48 for front viewing.

There are two mechanically driven structures which form a portion of the audio-visual reproduction device 34. One of these structures is the structure for advancement of the program unit 10 from one transparency 20 to another. The other is the mechanical drive of the audio tone arm. Motor 50 is mounted within the cabinet 36 and drives pulley 52 by means of a conventional belt 54. The rotative speed of pulley 52 is appropriate for the character of the recording in audio groove 14. If the recording is conventional, the pulley 52 rotates 45 RPM or 33 ⅓ RPM.

Pulley 52 is mounted upon shaft 56 which carries turntable 58. Shaft 56 and turntable 58 are rotatably mounted on platform 60, which encloses the lower part of cabinet 36, by means of bearing 62. Shaft 56 forms a center locator for entry into center hole 12 on program unit 10. Shaft 56 is a hollow shaft and is provided with a conical recess 64 in its top.

Figure 2:
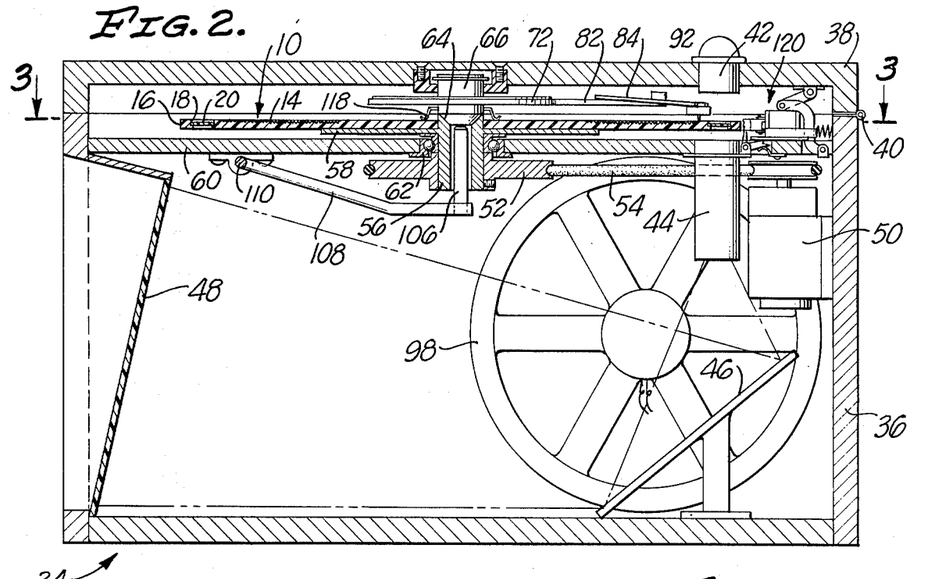
FIG. 2 is an enlarged sectional view taken generally along the line 2—2 of FIG. 1.
Figure 6:
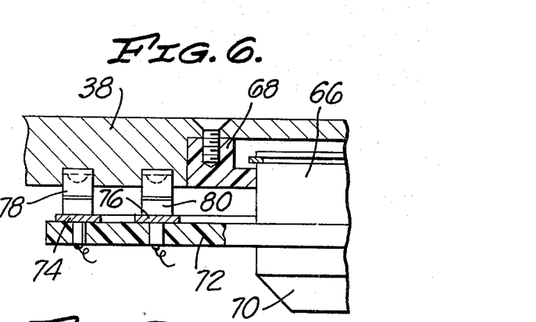
FIG. 6 is an enlarged partial detail through the slip ring structure and mounting bearing for the phonograph tone arm.
Figure 7:
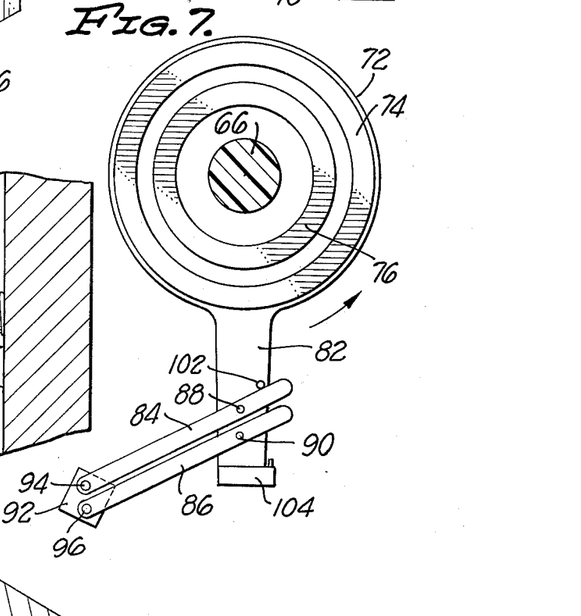
FIG. 7 is a top plane view of the audio tone arm and its drive structure.

Referring particularly to FIGS. 2, 6 and 7, floating shaft 66 is loosely mounted in bearing 68. Bearing 68 is mounted in a cavity in top 38. Alignment is such that when the top 38 is brought down into closed position on top of cabinet 36, floating shaft 66 is generally co-axially with shaft 56. Furthermore, floating shaft 66 has a frusto-conical lower end 70 which is adapted to fit within recess 64 when the top is closed. Thus, shaft 66 rotates with shaft 56 when the top is closed. The floating nature of shaft 66 is such that it permits firm, driving engagement. Mounted upon floating shaft 66 is slip ring disc 72 which carries slip rings 74 and 76 on the upper side thereof. Brushes 78 and 80 are respectively in sliding electrical engagement with slip rings 74 and 76, respectively.

Arm 82 extends outwardly from disc 72 and carries phonograph arms 84 and 86 thereon. Phonograph arms 84 and 86 are respectively pvioted to arm 82 at 88 and 90 and are respectively pivoted to phonograph pickup head 92 at 94 and 96. The described structure provides parallelogramic action to the pickup 92. Thus the needle in pickup 92 remains parallel to itself as it moves in different radial positions so that the needle remains in proper alignment with audio groove 14 throughout its entire spiral. Of course, longer arms could be used as in conventional phonograph practice to eliminate the need for parallelogramic action. However, this action permits the use of shorter phonograph arms.

From this structure it is seen that as disc 72 is rotated by the rotation of shaft 56, pickup 92 is rotated upon program unit 10. Providing the needle is started in the outermost groove, the needle will traverse the entire groove 14 to reproduce the physical analog of the audio signal. The pickup head 92 converts this physical analog to electrical signals, which are connected through slip rings 74 and 76 to brushes 78 and 80, and thence through an amplifier (not shown) to loud speaker 98. If desired, control knob 100 can be connected into the electronics so as to control the volume produced by loud speaker 98.

When the lid 38 is opened, shaft 66 is brought free of shaft 56. Thus, shaft 66 is free. The weight of arms 82, 84 and 86, as well as the weight of pickup head 92 are sufficient to rotate to this structure by the action of gravity until this structure is generally directed toward the hinged joint between top 38 and cabinet 36. Furthermore, the weight of pickup head 92 and phonograph arms 84 and 86 are sufficient to swing the pickup head 92 to the outermost radial position. This position is established by stop 102, which may be adjustable if desired, on arm 82. Stop 102 is positioned to be engaged by arm 84 at that position. Furthermore, switch 104 is positioned so that at the terminal inward radial position of pickup 92, switch 104 is actuated. This signals the end of the program and shuts off the audio-visual device. Of course, arms 84 and 86 are sufficiently flexibly mounted to arm 82 so that pickup head 94 can follow program unit 10.

It may be desirable on some occasions to suspend actuation of the audio portion and the progress of pickup head 92 along groove 14 so that a particular transparency 20 can be examined for a longer time. To accomplish this, lift rod 106 is positioned within shaft 56. Lift rod 106 is mounted on arm 108 which is pivoted at 110. This structure is identical in both embodiments, and as is seen in FIGS. 3 and 8, pivot 110 has cam follower arm 112 secured thereto. Cam 114 is rotatably by knob 116 and such rotation causes lifting of lift rod 106. Such lifting causes raising of shaft 66 out of driving contact with shaft 56 and rotation of disc 72 and pickup head 92 is stopped. Thus, the audio portion can be suspended while a particular visual indication is being viewed.

It is clear that turntable 58 is rotating and that program unit 10 rests thereupon. Thus, there is a rotative torque upon the program unit 10. This torque may be increased, if desired, by the use of a spring 118 whichh is mounted upon shaft 66 and bears against the top of program unit 10. If program unit 10 was unrestrained, it would rotate with disc 72 with the result that there would be no audio production and with the result that the transparencies 20 would continually spin past the lens 44 so that no particular transparency was projected. To control the rotative position of program unit 10, notches 22 are formed therein, as previously described. Furthermore, control unit 120, see FIGS. 2, 3, 4 and 5, is positioned on platform 60 adjacent the outer surface 16 of the program unit so as to be engagable with the index notches 22 of the program unit. When so engaged, the program unit is retained stationary in any particular position wherein one transparency, for example transparency 20' shown in FIG. 4, is in line with the optics.

Figure 5:
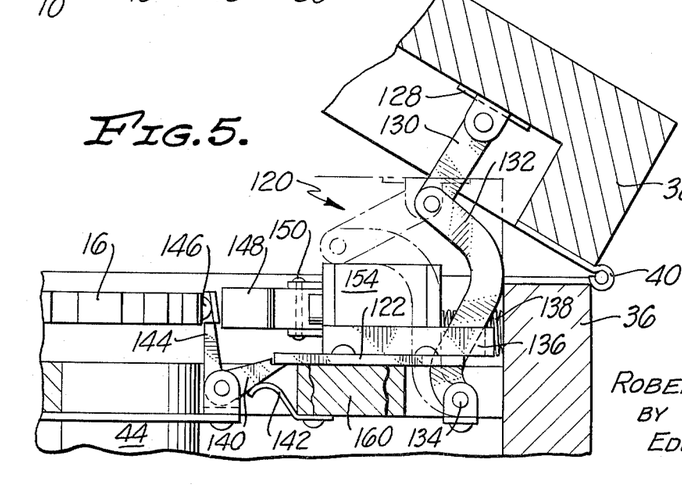
FIG. 5 is a side elevational view of the structure shown in FIG. 4.

Control unit 120 comprises a base 122 which is slidably mounted upon platform 60 by means of pins 124 operating in slots 126. The pins and slots are arranged for substantially radially motion of control unit 120 with respect to program unit 10. Bracket 128, see FIG. 5, is secured to the inside of top 38 and pivotally carries link 130. Link 130 is pivoted to lever 132 which is pivoted to platform 160 at 134. Lever 132 engages inside of bracket 136 which is in turn secured to base 122. Thus, when top 38 is raised, to the position shown in FIG. 5, lever 132 engages inside bracket 136 to move the entire control unit 120 to the right, compressing spring 138.

Latch 140 latches over the end of base 122, see FIG. 5, and spring 142 urges it toward latches position. Thus, when top 38 is again lowered and closed, latch 140 holds the base 122 in the retracted, rightmost position. Finger 144 is a portion of latch 140 and extends upwardly adjacent the outer surfaces 16 of program unit 10. The program unit 10 has a signal projection 146 extending outwardly therefrom. Finger 144 is in the way of projection 146 so that it is actuated thereby. Thus, when the top 38 is raised control unit 120 is retracted and is latched in the retracted position. A program unit 10 is placed on turntable 58 at random, and the top 38 is closed. Thereupon, when the audio-visual equipment is started and the turntable 58 rotates, the program unit 10 freely rotates until projection 146 actuates finger 144. At that point latch 140 is rotated and control unit 120 is released to slide to the left.

Control unit 120 carries stop finger 148 which is pivotally mounted at 150 and is urged by spring 152 into engagement with index notches 22 upon the periphery of program unit 10. When the control unit 120 is in the retracted position, stop finger 148 is free of the edge of the program unit. However, when the control unit 120 is released by projection 146, the control unit slides to the left by actuation of spring 138 and finger 148 engages in index notch 22', as is shown in FIG. 4. In this position, the transparency 20' is in line with the optics. Solenoid 154 is mounted upon base 122 and acts upon stop finger 148. When solenoid 154 is momentarily energized, it withdraws stop finger 148 from the notch 22 in which it was engaged so as to permit rotation of the program unit 10. However, energization of solenoid 154 is momentary so that the finger 148 rides on the outer surface 16 and egages in the next index notch 22 to align the next transparency 20 with the optics. Energization of solenoid 154 can be accomplished through suitable electrical equipment from any one of a number of sources. A manual change button can be provided. Indication of when the manual change button should be actuated can be provided by a script or can be provided by audible sounds in the audio portion of the program unit. Furthermore, such audible sounds can be detected and used for direct actuation of solenoid 154. Furthermore, inaudible signals can be provided in the audio portion of program unit 10, which inaudible signals can be used to momentarily energize solenoid 154. The latter is the preferred embodiment. Since it is conventional and well known, the structural details are not further disclosed herein.

It is thus seen that a compatible program unit 10 and audio-visual reproducing device 34 are provided wherein a program unit may be placed in the reproducing device, the unit turned on and the program proceed with both sound and successive transparencies projected upon a visual screen. Furthermore, the sound portion may be held in abeyance while a particular visual indication is inspected in further detail. Thus, the preferred embodiment provides a system which inexpensively and accurately, with particular ease of use provides co-ordinated audio and visual signals.

In the embodiment of this invention shown in FIGS. 8 and 9, the general program unit and audio-visual reproduction device are arranged along the same lines as is described in the preferred embodiment. However, as previously described, the program unit 24 is provided with opaque visual indications and the visual reproduction equipment is designed for projecting the opaque visual reproduction. Furthermore, rather than the controlled slip structure which advances the program unit 10, a positive drive is provided in this embodiment for the program unit upon advance from one visual indication to another.

Referring now to FIGS. 8 and 9, the audio-visual reproduction device is generally indicated at 156. It comprises a cabinet 158 having platform 160 therein and having a hinged top 162 thereon. Within the cabinet 158 beneath platform 160 is mounted lamp 164 which is directed toward the particular visual indication on the underside 30 of program unit 24 to illuminate the image and project it onto mirror 168. Mirror 168 in turn projects the image upon mirror 170 which in turn projects the image upon the rear of rear projection translucent display screen 172. Thus, a particular image is presented upon screen 172, depending upon the rotative position of program unit 24.

Motor 174 drives pulley 176 through belt 178, identical to the audio drive in device 34. Shaft 180 carries pulley 176 and carries turntable 182. Shaft 180 extends through a central opening in program unit 24 and turntable 182 supports the program unit. If desired, further support can be provided adjacent the edges of program unit 24, as by annular ring 184. It should be noted that turntable 182 is smaller than turntable 158. This is because turntable 182 does not provide the propulsive force necessary to index program unit 24 from one visual indication to the next. Floating shaft 186 engages in a conical recess within shaft 180, identically to shaft 66 engaging in shaft 56. Furthermore, shaft 186 carries disc 188, arm 190, photograph arms 192 and pickup 194 identically to disc 72, arm 82, phonograph arms 84 and 86 and pickup 92. In fact, the entire audio reproduction equipment is identical to that described above. Output is through loud speaker 196 which is controlled by control 198.

Referring now more particularly to FIG. 9, control unit 200 is shown therein. Control unit 200 is positive driving structure to advance program unit 24 from one position to the next so that successive visual indications are projected onto screen 172. Driver 202 has a slot 204 therein which is engaged over pin 206 to guide the motion of driver 202. Driver 202 has finger 208 which extends between drive wheel 210 annd solenoid 212. Drive wheel 210 is continuously rotating in the counterclockwise direction, as seen in FIG. 9, and may be driven by a separate motor or from motor 174. Drive wheel 210 has a suitable friction surface so that when finger 208 is pressed thereupon, driver 202 is urged upwardly. Solenoid 212 is positioned so that when energized it presses finger 208 against drive wheel 210. Spring 214 maintains driver 202 in the position illustrated, with finger 208 away from drive wheel 210 when solenoid 212 is not energized. Spring 214 is engaged upon stop pin 216 and switch 218 is positioned in the path of stop pin 216. The electrical connections within circuit box 220 are such that when a short time electrical signal requiring change in visual projections is received in circuit box 220, solenoid 212 is actuated. This forces finger 208 against drive wheel 210 and driver 202 moves upward, as is seen in FIG. 9. Upward motion continues, even though the signal may be cut off by means of a holding relay or the like in circuit box 220. As driver 202 rises, stop pin 216 contacts switch 218 to deenergize solenoid 212. Thereupon driver 202 is retracted to the lower position by spring 214. Driver 202 carries pawl 222 which is positioned to be engagable in one of the index notches 32. Pawl 222 is pivoted at 224 and is spring loaded into engagement with surfaces 28 or notch 32 by means of spring 226. Stop 228 prevents pawl 222 from swinging free. Thus, upon a cycle of driver 202 from the position shown to the upper position, program unit 24 is advanced. The amount of advance is controlled by adjustable positioning of switch 218. Program unit 34 is detented into position by means of detent spring 230 which is mounted on platform 160 by entering into the appropriate notch 32.

Control unit 200 does not automatically position program unit 24 to the starting point, but such is accomplished by correct insertion of the program unit 24 into the audio-visual device 156. Indicia 232 in the form of a arrow or the like permits the operator to place the program unit 24 in the correct starting orientation. For example, as is illustrated in FIG. 9, the program unit 24 is placed so that indicia 232 is directed toward the notch 32 which contains pawl 222 at the start of the operation. Thus, upon actuation of drive unit 202 the program unit 24 is advanced from its starting position to the next position. Advancement signals of the type described in the previous embodiment may be used for program unit advancement. The program unit 24 is detented into position and restrained against rotation by detent spring 230.

In the above described embodiments of program units and reproduction units a mechanical representation of the audio signal impressed into a groove, as in common phonograph record practice, has been disclosed as a preferred embodiment. However, it is clear that optical or magnetic signals could be suitably placed on such a program unit. In any case, grooves are the preferable means for tracking the pick-up head with respect to the audio signal representation on the program unit. Thus, grooves are considered desirable to aid in tracking, for other tracking devices are both more expensive and less reliable. In the case of magnetic or optical audio representations on the program unit, the representations may not be in the groove but may be adjacent the groove. In these cases, it is clear that phonograph pick-up heads would not be used, but suitable magnetic or optical pick-up heads would be used.

With respect to the program unit, it is clear that the center hole is used both for locating the program unit and for supplying drive to the pick-up head. However, if desired, the center hole can be eliminated and the program unit located in position by an edge ring. In this case the pick-up head can be driven from a position outside the periphery of the program disc. In another example, the pick-up head can be placed beneath the program unit. In this embodiment all of the moving structure would be located in the lower unit rather than having the pick-up head rotativey mounted upon the cover. It is also possible to enlarge the center hole and place the indexing notches on the inside edge of the disc. Another modification would be to place the program disc in a carrier that is fitted with a device to control the picture advance.

This invention having been described in its preferred embodiment, it is clear that it is susceptible to numerous modifications and embodiments within the scope of this invention and without the exercise of the inventive faculty. Accordingly, the scope of this invention is defined by the scope of the following claims.

I claim:

1. An audio-visual device which comprises:
   means for holding a program unit stationary, said stationary program unit including means representing an audio signal and a plurality of visual representations,
   optical system means for projecting a single one of said visual representations at a time,
   rotatable audio reproduction pickup means for obtaining an audio signal from said means representing an audio signal,
   means for rotating said pickup means with respect to said program unit when said stationary program unit is held by said means for holding so that said pickup means is capable of obtaining all of said audio signal during the use of said audio-visual reproducing device,
   a control unit, said control unit being adapted to engage with a program unit within said audio-visual device so as to control the program unit so that the program unit incrementally advances within said audio-visual device so as to sequentially present successive visual indications to said optical system,
   said control unit includes a finger adapted to engage in index notches in the program unit,
   said means for rotating includes friction drive means, said friction drive means being adapted to apply a rotative drive torque to a program unit positioned within said audio-visual device,
   said finger on said control unit being adapted to restrain rotation of the program unit, said finger being momentarily retractable so that the program unit is permitted to rotate and said finger engages in a subsequent index notch in the program unit to restrain rotation of the program unit when the program unit is in a different rotative position within said audio-visual reproducing device.

2. An audio-visual device as claimed in claim 1 wherein;
   said control unit means is movably mounted within said device, and including:
   means urging said control unit means so that said finger on said control unit means is adapted to engage an index notch on said program unit,
   latch means, said latch means having a latch finger adapted to be positioned adjacent the program unit,
   said latch means restraining said control unit means away from the program unit so that said finger on said control unit means is away from said program unit and the program unit is rotatably unrestrained,
   said latch finger being adapted to be engaged by a particular part of the program unit so that when the program unit rotates to a particular position said latch finger is actuated to release said latch means and said control unit means is permitted to move towards the program unit so that the finger on said control unit means is adapted to engage an index notch in the program unit.

3. An audio-visual device as claimed in claim 2 including
   a cabinet having a top, said top being openable so as to close the upper interior of said cabinet, said top being linked to said control unit means so that when said top is opened said control unit means is retracted and said latch means latches said control unit means is a retracted position.

4. An audio-visual device which includes:
   a cabinet having a top capable of being opened and closed and a projection area,
   means for holding a program unit stationary within said top of said cabinet,
   a program unit held stationary by said means for holding, said program unit including spiral audio signal representing means and a plurality of visual representation means, rotatable audio reproduction pick-up means for obtaining an audio signal from said audio signal means, said rotatable pick-up means being located on said top so as to be capable of being moved with respect to said program unit so as to be placed from said program unit when said top is opened and so as to engage said audio signal means when said top is closed, means for rotating said pick-up means when said top is in a closed position, said means for rotating being located within said cabinet and being operative so as to cause rotation of said pick-up means when said top is in said closed position, optical means for projecting a single one of said visual representation means upon said screen at a time, and means for advancing said program unit so that different of said visual representation means are projected by said optical means sequentially.

5. An audio-visual device as claimed in claim 4 wherein:

said projection area is a projection screen located in the front of said device.

6. An audio-visual device as claimed in claim 4 wherein:

said program unit is an integrally formed member in which said visual representation means are held in a fixed position with respect to said audio signal means.

7. An audio-visual device as claimed in claim 4 wherein:

said program unit includes a plurality of openings and wherein said visual representation means are transparencies and wherein each of said transparencies is mounted in one of said openings.

8. An audio-visual device which comprises:

means for holding a program unit stationary, said stationary program unit including means representing an audio signal and a plurality of visual representations, optical system means for projecting a single one of said visual representation at a time, rotatable audio reproduction pickup means for obtaining an audio signal from said means representing an audio signal, means for rotating said pickup means with respect to said program unit when said stationary program unit is held by said means for holding so that said pickup means is capable of obtaining all of said audio signal during the use of said audio-visual reproducing device, said means for rotating said pickup means including a rotatable shaft, said shaft being adapted to be rotated, a floating shaft in engagement with said rotatable shaft, a pickup arm pivotally mounted upon said floating shaft, said pickup means being mounted on said pickup arm.

9. An audio-visual device as claimed in claim 8 including:

slip ring means mounted on said floating shaft, said slip ring means being electrically connected to said pick-up means, said audio-visual device having a cabinet, said cabinet having a top, said top carrying said floating shaft, so that when said top is raised said floating shaft end said pick-up means are moved.

10. An audio-visual device as claimed in claim 9 including:

disconnection means to stop said means for rotating said pick-up means from driving said pick-up means, said disconnection means comprising means engageable with said floating shaft, said engageble means being movable from a position away from said floating shaft to a position wherein said floating shaft is moved out of driving engagement with said rotatable shaft so as to stop driving of said floating shaft by said rotatable shaft.

11. An audio-visual device which includes:

a cabinet, one wall of which is capable of being moved between an open position and a closed position, holding means for supporting a program unit within said cabinet, said holding means being located within the interior of said cabinet, a disk-shaped program unit having a center, groove means representing an audio signal located on one surface of said program unit and extending around said center, and a plurality of visual representation means located so as to extend concentrically around said center, said groove means being spaced separate and apart from said visual representation means, said program unit being located on said holding means, projection means mounted within said cabinet for projecting an image of a single one of said visual representation means which is located in a specific location, control means for causing said program unit to rotate about said center at intervals so that successive of said visual representation means are located in said specific location, rotary pickup means mounted on said one wall so as to be movable therewith for engaging said groove means so as to produce a signal by contact with said groove means when said one wall is in said closed position, drive means for rotating said pickup means operatively connected to said pickup means so as to cause said pickup means to rotate around said center in engagement with said groove means when said one wall is in said closed position, and sound producing means connected to said pickup means for producing an audible sound in response to said signal produced by said pickup means.

12. An audio-visual device as claimed in claim 11 wherein:

said groove means comprises a spiral groove located about said center of said program unit, said groove having a beginning and an end, said pickup means is movably mounted on said one wall so as to automatically move to a position to engage said beginning of said groove means each time said one wall is moved to said open position and capable of engaging said beginning of said groove means each time said wall is moved to said closed position.

13. An audio-visual device which includes:

a housing having a movable lid, a projection screen mounted on said housing so as to be visible from the exterior thereof, holding means for supporting a program unit within said housing, said holding means being located within the interior of said housing, a disk-shaped program unit having a center, groove means representing an audio signal located so as to extend around said center located on one surface of said program unit and a plurality of visual representation means located so as to extend concentrically around said center, said groove means being spaced separate and apart from said visual representation means, said program unit being located on said holding means, projection means mounted within said housing for projecting an image of a single one of said visual representation means which is located in a specific location on to said projection screen, control means for causing said program unit to rotate about said center at intervals so that successive of said visual representation means are located at said specific location, rotary pickup means mounted on said lid for engaging said groove means so as to produce a signal by contact with said groove means, drive means for rotating said pickup means operatively connected to said pickup means so as to cause said pickup means to rotate around said center in engagement with said groove means, and sound producing means connected to said pickup means for producing an audible sound in response to said signal produced by said pickup means.

14. An audio-visual device as claimed in claim 13 wherein:

said housing has a lid, said pickup means is mounted on said lid so as to engage said groove means when said lid is closed.

15. An audio-visual device as claimed in claim 14 wherein:

said groove means comprises a spiral groove located concentrically about said center, said pickup means is movably mounted on said lid so as to be automatically moved each time said lid is opened to a position in which it will engage the beginning of said groove means when said lid is thereafter closed.

16. An audio-visual device as claimed in claim 13 including:

means for stopping the operation of said drive means so as to permit examination of a specific image projected on said screen without said pickup means being rotated.

* * * * *